(No Model.)

J. V. BLAKE & F. C. WILSON.
WATER FILTER.

No. 400,736. Patented Apr. 2, 1889.

Witnesses
Chas. J. Williamson.
Henry C. Hazard.

Inventors
James Vila Blake
F. Cortez Wilson
by Pringle and Russell
their Attorneys

UNITED STATES PATENT OFFICE.

JAMES VILA BLAKE AND F. CORTEZ WILSON, OF CHICAGO, ILLINOIS; SAID BLAKE ASSIGNOR TO SAID WILSON.

WATER-FILTER.

SPECIFICATION forming part of Letters Patent No. 400,736, dated April 2, 1889.

Application filed January 14, 1889. Serial No. 296,309. (No model.)

*To all whom it may concern:*

Be it known that we, JAMES VILA BLAKE and F. CORTEZ WILSON, of Chicago, in the county of Cook, and in the State of Illinois, have invented certain new and useful Improvements in Water-Filters; and we do hereby declare that the following is a full, clear, and exact description thereof, reference being had to the accompanying drawings, in which—

Figure 1:
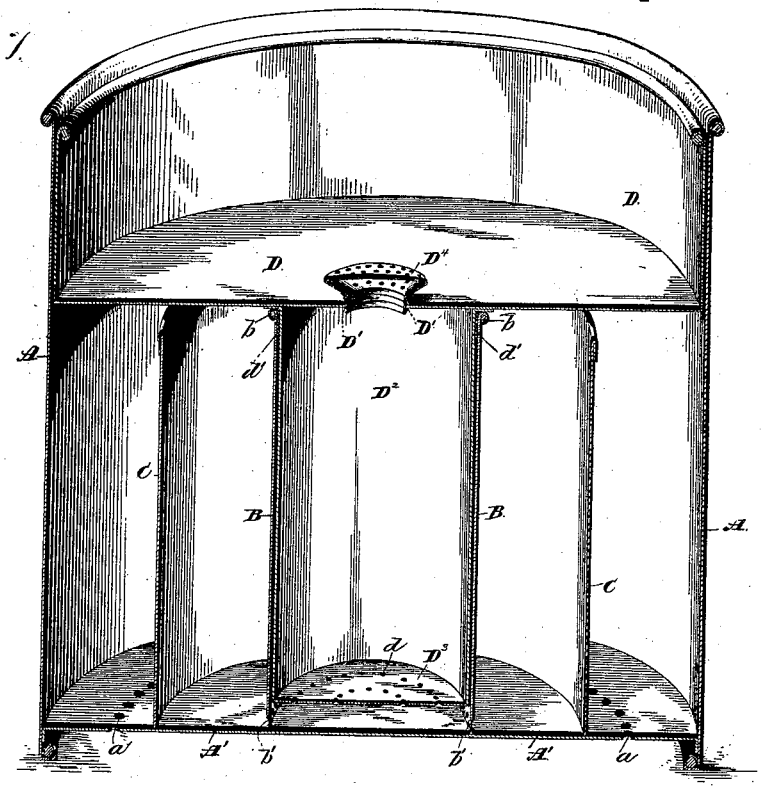
Figure 2:
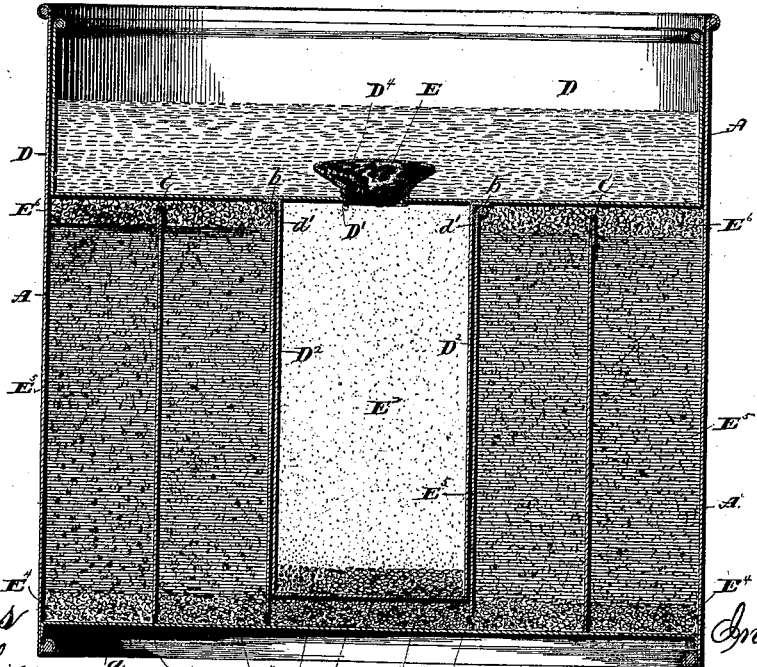

Figure 1 shows in perspective a vertical central section of our filter with its packing or filling removed, and Fig. 2 a similar section in elevation of the filter as packed and in use.

Letters of like name and kind refer to like parts in each of the figures.

The object of our invention is to provide a cheap and efficient water-filter which can be easily and quickly cleansed and repacked; and to this end our invention consists in the filter and in the construction, arrangement, and combination of the parts thereof, as hereinafter specified.

While our filter, as it will be set forth, is of the kind which is used in connection with a receptacle or tank into or on the top of which the filter is set and into which the filtered water flows, we desire it to be understood that our invention is applicable to other forms of filter as well.

In the drawings, A denotes the casing of the body of the filter, which can be of any desired shape or dimensions. As shown, it is cylindrical, as we prefer to have it. The casing-walls are extended down below the bottom A′ and preferably wired around their lower edge, so as to form a support to rest upon or around the top of the receptacle to be used with the filter.

Arranged centrally within the filter-body is the upright annular partition B, at its lower end resting upon or attached to the bottom A′. We prefer to have it fastened to the bottom by soldering or otherwise. This partition, the space within which forms a chamber concentric with the walls of casing A, extends upward two-thirds or three-fourths of the distance from the bottom A′ to the upper edge of the casing, and is preferably wired, as shown, around its top at $b$. Close to its lower end a series of small apertures, $b'\ b'$, are made through it, as shown in the drawings.

Around partition B, midway between it and the casing A, extends another annular partition, C, like partition B, attached at its lower end or edge to the bottom A′. This second and concentric partition is not as high as partition B.

In the portion of bottom A′ between partition C and casing A are made some small apertures, $a\ a$, through which water can flow from the filter down into the receptacle placed below.

Within the upper end of the casing A, and resting upon the top of partition B, is the pan D, having a central aperture, D′, screw-threaded, as indicated in the drawings. A central neck or extension, $D^2$, of the pan extends down within the partition B nearly to the casing-bottom A′. The lower end of this extension is provided with a bottom, $D^3$, in which are series of small apertures, $d\ d$.

To prevent any water getting upward between the pan-extension and the partition B and passing over the top of such partition, a rubber or other band, $d'$, is placed around the extension at its upper end. Such band forms a packing between the pan-extension and the partition. With the pan-bottom resting on the top of partition B there will be a space left between the upper edge of partition C and the pan-bottom, through which water can pass from the space between the two concentric partitions B and C to the space between the latter partition and the casing.

Into the central aperture, D′, in the pan-bottom is screwed the neck of a piece, $D^4$, similar to an ordinary sprinkler-nozzle in shape and construction, having, as shown, a number of small holes in its top and sides above the threaded flange or rim around the aperture D′.

In our filter, constructed as shown and described, we place the packing or filtering materials as follows: Within the nozzle $D^4$ is packed a piece of sponge, E, which can be crowded into the space for it, so that it cannot get out by accident. On the bottom of the pan-extension $D^2$ is placed about half an inch of gravel, coarse enough not to pass through apertures $d\ d$, and the rest of the space within the extension is filled with sand, $E^2$, which can be introduced through the aperture $D'$ when the nozzle $D^4$ is removed. At the bottom of the space, within the inner partition, B, and below the pan-extension $D^2$, is placed a body or layer of gravel, $E^3$. On the bottoms of the annular chambers formed, respectively, between the two annular partitions, and between the outer partition and the casing A, we also place layers of gravel $E^4$. The gravel layer within the inner annular chamber should be thick enough to rise above and cover the openings $b\ b$ in the inner partition. The two annular chambers are then filled with animal charcoal, $E^5\ E^5$, nearly up to the level of the upper edge of partition C. The space between the top of the charcoal and the level of the upper edge of the partition, or of the pan-bottom resting on such edge, is then filled with a body of gravel, $E^6$.

With the sponge-filled nozzle screwed in place and the packing arranged as described and shown, the operation of our filter is as follows: Water is poured into pan D, so as to stand above the nozzle, or the level of the apertures therein. From the pan it passes first into the nozzle, through the sponge, and down into the pan-extension, where it percolates through the body of sand $E^2$. The sponge acts as a strainer to strain off or prevent the downward passage of the larger particles of matter with the water. The sand, as the water passes through it, still further strains and purifies it of the smaller suspended or floating particles of matter. From the body of sand the water passes through the gravel $E^6$ and then down through apertures $d\ d$ in the bottom of the pan neck or extension. It then passes through the gravel $E^3$ and outward through the apertures $b'\ b'$ in the partition B and the gravel at the bottom of the inner annular chamber. It then percolates upward through the animal charcoal in such chamber and the gravel at the top of the chamber and over the top of partition C, and after passing down through the charcoal and gravel in the outer chamber it flows out through the exit-openings $a\ a$ in the filter-bottom. The two bodies of charcoal, through which the water passes after leaving the body of sand, serve to most thoroughly and effectually clarify and purify the water, so as to make it fit and healthful for drinking purposes, even if the water as it enters pan D is muddy and foul.

Our filter, as constructed and packed with filtering material, can be most easily cleaned and repacked. When the pan, with its downward extension, is lifted out, the packing in the several chambers is exposed, so that it can be readily taken out and replaced. With the straining-nozzle removed from the aperture in the bottom of the pan, the sponge can be taken from within such nozzle and cleansed and put back, or a new piece can be put in its place. The sand and gravel within the pan-extension may be removed when desired and replaced through the nozzle-receiving aperture in the pan-bottom.

Having thus described our invention, what we claim is—

1. In combination with the casing, the inner annular partition provided with apertures at or near its lower edge, the outer lower annular partition, the pan resting upon the inner partition and having the neck or extension with perforated bottom extending down within the inner partition, the perforated nozzle in an opening from the pan into the pan-extension, and suitable outlets from the lower portion of the space around the outer partition, substantially as and for the purpose shown.

2. In combination with the pan having the central opening in its bottom, and the extension on the pan having a perforated bottom, the filter-casing having its bottom provided with apertures near its outer edge, the central annular partition supported on such bottom extending up around the pan-extension to the pan-bottom, and provided around its lower edge with apertures, the outer partition extending up around the inner partition to a point below the pan-bottom, a perforated nozzle in the central opening in the pan-bottom, and suitable filter-packing in the pan-extension, and the chambers formed between the two partitions and the outer partition and casing-wall, substantially as and for the purpose set forth.

3. In a filter, in combination with the casing having its bottom provided with exit-apertures near its outer edge, the inner annular partition extending upward from the casing-bottom, and near such bottom provided with apertures, the outer partition extending up from the casing-bottom, but lower than the inner partition, the pan having its bottom resting upon the top of the inner partition and provided with the extension with perforated bottom surrounded by the inner partition, the straining-nozzle through which the water flows from the pan into the pan-extension, the sponge within the nozzle, a body of sand within the pan-extension, and the charcoal packing within the annular chambers between the two partitions and the casing, substantially as and for the purpose described.

4. In combination with the casing having its bottom perforated near its outer edge, the outer partition, and the inner partition made higher than the other and provided with apertures near its lower edge, the pan having its bottom supported upon the top of the inner partition and provided with the central extension with perforated bottom, the straining-nozzle in the passage from the pan into the pan-extension, a sponge within such nozzle, a layer of gravel on the bottom of the pan-extension, and a body of sand within such extension above the gravel, a layer of gravel on the casing-bottom, the charcoal packing or filling within the two chambers between the outer and inner partitions and between the outer partition and the casing, and a layer of gravel on top of such filling, extending down to a point below the level of the top of the outer partition, substantially as and for the purpose specified.

In testimony that we claim the foregoing we have hereunto set our hands this 26th day of December, 1888.

JAMES VILA BLAKE.
    F. CORTEZ WILSON.

Witnesses:
 CHAS. P. RANDALL,
 LEWIS M. POWELL.